US012559388B2

(12) United States Patent
Yang et al.

(10) Patent No.: US 12,559,388 B2
(45) Date of Patent: Feb. 24, 2026

(54) METHOD FOR PREPARING POSITIVE ELECTRODE ACTIVE MATERIAL PRECURSOR FOR LITHIUM SECONDARY BATTERY

(71) Applicant: LG Chem, Ltd., Seoul (KR)

(72) Inventors: Song Yi Yang, Daejeon (KR); Kyoung Wan Park, Daejeon (KR); Seong Bae Kim, Daejeon (KR); Cho Hee Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 892 days.

(21) Appl. No.: 17/294,880

(22) PCT Filed: Nov. 29, 2019

(86) PCT No.: PCT/KR2019/016801
§ 371 (c)(1),
(2) Date: May 18, 2021

(87) PCT Pub. No.: WO2020/111898
PCT Pub. Date: Jun. 4, 2020

(65) Prior Publication Data
US 2022/0009791 A1 Jan. 13, 2022

(30) Foreign Application Priority Data
Nov. 30, 2018 (KR) ........................ 10-2018-0152271

(51) Int. Cl.
*C01G 53/82* (2025.01)
*H01M 4/02* (2006.01)
(Continued)

(52) U.S. Cl.
CPC ............ *C01G 53/82* (2025.01); *H01M 4/525* (2013.01); *H01M 10/0525* (2013.01);
(Continued)

(58) Field of Classification Search
None
See application file for complete search history.

(56) References Cited

U.S. PATENT DOCUMENTS 8,592,085 B2 * 11/2013 Kobino ................. H01M 4/525
429/231.95
2013/0078520 A1 3/2013 Toya et al.
(Continued)

FOREIGN PATENT DOCUMENTS

CN 107546383 A 1/2018
JP 2011113792 A 6/2011
(Continued)

OTHER PUBLICATIONS

English translation of KR 20160099876 A Description (Year: 2016).*
(Continued)

*Primary Examiner* — Anthony J Zimmer
*Assistant Examiner* — Zachary John Baum
(74) *Attorney, Agent, or Firm* — Lerner David LLP

(57) ABSTRACT

A method for preparing a bimodal-type positive electrode active material precursor is provided. The method is capable of not only increasing productivity by preparing positive electrode active material precursors having small diameters and large diameters in a single reactor but also improving packing density per unit volume, a positive electrode active material precursor prepared by the preparation method and having improved packing density, and a positive electrode for a secondary battery and a lithium secondary battery including the same.

5 Claims, 2 Drawing Sheets

(51) Int. Cl.
    *H01M 4/525*         (2010.01)
    *H01M 10/0525*      (2010.01)
(52) U.S. Cl.
    CPC ...... *C01P 2004/03* (2013.01); *C01P 2004/53*
        (2013.01); *C01P 2004/61* (2013.01); *C01P*
      *2006/40* (2013.01); *H01M 2004/028* (2013.01)

(56)           References Cited

U.S. PATENT DOCUMENTS

| | | |
|---|---|---|
| 2013/0202966 A1 | 8/2013 | Yu et al. |
| 2014/0377660 A1 | 12/2014 | Fukui et al. |
| 2015/0263341 A1 | 9/2015 | Kato et al. |
| 2015/0340686 A1 | 11/2015 | Sun et al. |
| 2016/0190579 A1 | 6/2016 | Sun et al. |
| 2018/0287135 A1 | 10/2018 | Shin et al. |
| 2019/0214628 A1 | 7/2019 | Choi et al. |
| 2019/0341598 A1 | 11/2019 | Nam et al. |

FOREIGN PATENT DOCUMENTS

| | | | |
|---|---|---|---|
| JP | 2017154915 A | 9/2017 | |
| JP | 2018534734 A | 11/2018 | |
| KR | 20110083383 A | | 7/2011 |
| KR | 20130009739 A | | 1/2013 |
| KR | 20140126302 A | | 10/2014 |
| KR | 101547972 B1 | | 8/2015 |
| KR | 101614991 B1 | | 4/2016 |
| KR | 20160099876 A | * | 8/2016 |
| KR | 101748999 B1 | * | 6/2017 |
| KR | 101815779 B1 | | 1/2018 |
| KR | 20180055258 A | | 5/2018 |
| KR | 20180063863 A | | 6/2018 |
| KR | 20180077081 A | | 7/2018 |
| KR | 20180077090 A | | 7/2018 |
| KR | 20180084727 A | | 7/2018 |
| KR | 20180091754 A | | 8/2018 |
| KR | 20180098735 A | | 9/2018 |
| WO | 2014104234 A1 | | 7/2014 |

OTHER PUBLICATIONS

English translation of KR 101748999 B1 Description (Year: 2017).*
International Search Report for Application No. PCT/KR2019/016801, dated Mar. 9, 2020, 2 pages.

* cited by examiner

METHOD FOR PREPARING POSITIVE ELECTRODE ACTIVE MATERIAL PRECURSOR FOR LITHIUM SECONDARY BATTERY

CROSS-REFERENCE TO RELATED APPLICATIONS

The present application is a national stage entry under 35 U.S.C. § 371 of International Application No. PCT/KR2019/016801 filed on Nov. 29, 2019, which claims priority to 10-2018-0152271, filed on Nov. 30, 2018, in the Korean Intellectual Property Office, the disclosures of which are incorporated herein in their entirety by reference.

TECHNICAL FIELD

The present invention relates to a method for preparing a positive electrode active material precursor for lithium secondary battery, a positive electrode active material precursor prepared by the same, and a lithium secondary battery including the positive electrode active material precursor.

BACKGROUND ART

As technology development and demand for mobile devices have increased, the demand for secondary batteries as an energy source has been rapidly increased. Among such secondary batteries, lithium secondary batteries having high energy density and voltage, long cycle life, and a low self-discharging rate have been commercialized and widely used.

As a positive electrode active material of a lithium secondary battery, a lithium transition metal composite oxide is used. Among such lithium transition metal composite oxides, a lithium cobalt composite metal oxide such as $LiCoO_2$ which has a high functional voltage and excellent capacity properties has been mainly used. However, $LiCoO_2$ has very poor thermal properties due to the destabilization of a crystal structure according to de-lithium. Also, $LiCoO_2$ is expensive, and thus, has a limitation in being used as a power source for electric vehicles or the like in a large amount.

As a material to replace $LiCoO_2$, a lithium manganese composite metal oxide ($LiMnO_2$. $LiMn_2O_4$, and the like), a lithium iron phosphate compound ($LiFePO_4$ and the like), or a lithium nickel composite metal oxide ($LiNiO_2$ and the like) and the like has been developed. Among the above materials, research and development has been actively conducted on a lithium nickel composite metal oxide which has a high reversible capacity of about 200 mAh/g, thereby easily implementing a high capacity battery. However, when compared with $LiCoO_2$, $LiNiO_2$ has a lower thermal stability, and has a problem in that when an internal short circuit occurs due to external pressure or the like in a charged state, a positive electrode active material itself is decomposed, causing the rupture and ignition of a battery. Accordingly, as a method for improving the thermal stability of $LiNiO_2$, which is low, while maintaining the excellent reversible capacity thereof, a lithium-nickel-cobalt metal oxide in which a part of Ni is substituted with Co, Mn or Al has been developed.

However, the lithium-nickel-cobalt metal oxide has a problem in that the capacity thereof is low. In order to increase the capacity of the lithium-nickel-cobalt metal oxide, a method for increasing the content of nickel or a method for increasing the packing density per unit volume of a positive electrode active material has been studied.

Typically, in order to prepare a high-density positive electrode active material having a high packing density per unit volume, a method in which each of a small-diameter precursor and a large-diameter precursor is prepared, and then mixed together and fired, or a method in which prepared precursors are separately recovered, mixed together, and then fired has been used. However, in this case, a separation device, a space, and the like are required to separate and recover each of a small-diameter precursor and a large-diameter precursor prepared and a separate mixing process is required, so that there has been a problem in that preparation costs and preparation time are increased.

Therefore, there has been a demand for developing a method for preparing a positive electrode active material precursor, the method capable of uniformly mixing a small-diameter precursor and a large-diameter precursor while reducing preparation costs and preparation time.

DISCLOSURE OF THE INVENTION

Technical Problem

The first aspect of the present invention provides a method for preparing a bimodal-type positive electrode active material precursor, the method capable of not only increasing productivity by preparing positive electrode active material precursors having small diameters and large diameters in a single reactor but also improving packing density per unit volume.

The second aspect of the present invention provides a positive electrode active material precursor prepared by the above method and having excellent packing density per unit volume.

The third aspect of the present invention provides a method for preparing a positive electrode active material using the positive electrode active material precursor and having excellent firing uniformity and a method for preparing a positive electrode active material.

The fourth aspect of the present invention provides a positive electrode for lithium secondary battery including the positive electrode active material and a lithium secondary battery including the positive electrode.

Technical Solution

According to an aspect of the present invention, there is provided a method for preparing a bimodal-type positive electrode active material precursor, the method including step 1 of preparing a first transition metal aqueous solution and a second transition metal aqueous solution, step 2 of adding a first reaction raw material including the first transition metal aqueous solution, an ammonium cation complex forming agent, and a basic aqueous solution to a reactor, and then subjecting the mixture to a co-precipitation reaction under a primary pH condition to form nuclei of first positive electrode active material precursor particles, step 3 of adjusting the input amount of the first reaction raw material in order to adjust the pH in the reactor to be a secondary pH condition which is in a lower range than the primary pH condition, and growing the first positive electrode active material precursor particles, step 4 of adding a second reaction raw material including the second transition metal aqueous solution, an ammonium cation complex forming agent, and a basic aqueous solution to the reactor containing the first positive electrode active material precursor particles to allow the pH in the reactor to meet the primary pH condition, and then subjecting the mixture to a co-precipitation reaction to form nuclei of second positive electrode active material precursor particles, and step 5 of adjusting the input amount of the second reaction raw material in order to adjust the pH in the reactor to meet the secondary pH condition, and then simultaneously growing the first positive electrode active material precursor particles and the second positive electrode active material precursor particles to prepare a bimodal-type positive electrode active material precursor including the first positive electrode active material precursor particles and the second positive electrode active material precursor particles having different average particle diameters ($D_{50}$).

According to another aspect of the present invention, there is provided a bimodal-type positive electrode active material precursor prepared by the method described above and first positive electrode active material precursor particles having an average particle diameter ($D_{50}$) of 8 μm to 15 μm and having a core-shell structure and second positive electrode active material precursor particles having an average particle diameter ($D_{50}$) of 1 μm to less than 8 μm, wherein the first positive electrode active material precursor particles have a core-shell structure including a core portion having a nickel content of 60 mol % or greater based on the total number of moles of transition metals and a shell portion formed on the surface of the core portion and having a different average composition from the core portion.

According to yet another aspect of the present invention, there is provided a method for preparing a positive electrode active material, the method including a step of mixing the positive electrode active material precursor according to the present invention with a lithium raw material and then firing the mixture.

According to yet another aspect of the present invention, there are provided a positive electrode for a lithium secondary battery, the positive electrode including a positive electrode active material prepared by the method described above, and a lithium secondary battery including the same.

Advantageous Effects

According to the present invention, although a positive electrode active material precursor is prepared in a single reactor, the pH at the time of a co-precipitation reaction is controlled, so that a bimodal-type positive electrode active material precursor having different average particle diameters ($D_{50}$) may be prepared. Accordingly, the packing density per unit volume is improved, so that a bimodal-type positive electrode active material precursor having improved productivity and exhibiting high-capacity properties may be provided.

Also, according to the present invention, since the average composition of a large-diameter first positive electrode active material precursor having a core-shell structure and the average composition of a small-diameter second positive electrode active material precursor are different, when the precursors are mixed with a lithium raw material and fired, a positive electrode active material having excellent firing uniformity may be prepared by compensating for an influence caused by the difference in average particle size with the difference in composition and solving the temperature difference according to the mixed firing.

BEST MODE FOR CARRYING OUT THE INVENTION

Figure 1:
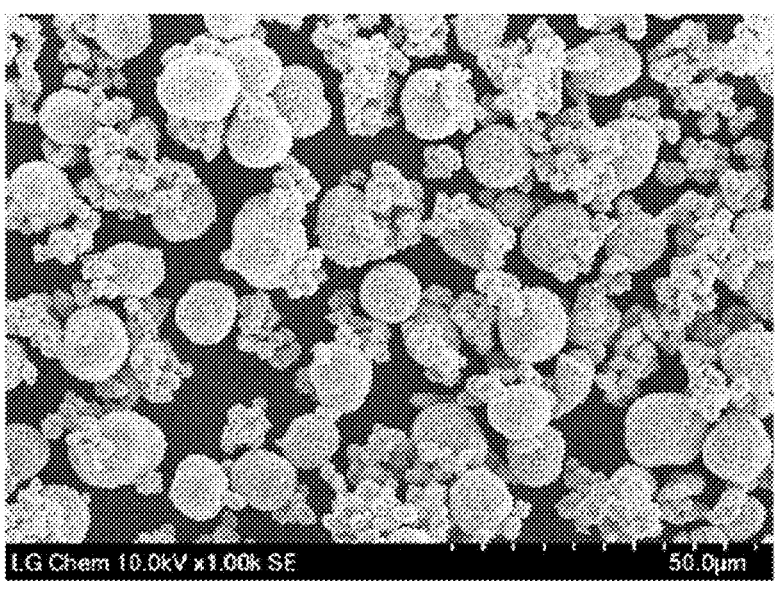
FIG. 1 is an SEM image of a bimodal-type positive electrode active material precursor prepared in Example 1.

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Throughout the present specification, the term "tap density" refers to the apparent density of powder which is obtained by vibrating a container under predetermined conditions when filling the powder, and may be measured using a typical tap density measurement device. Specifically, the tap density may be measured in accordance with ASTM B527-06, and may be measured using TAS-2S (Logan Co., Ltd.).

In the present invention, an 'average particle diameter ($D_{50}$)' may be defined as a particle diameter corresponding to 50% of volume accumulation in a particle diameter distribution curve. The average particle diameter ($D_{50}$) may be measured by, for example, a laser diffraction method. For example, the average particle diameter ($D_{50}$) of a positive electrode active material may be measured by a method in which particles of the positive electrode active material are dispersed in a dispersion medium, and then introduced into a commercially available laser diffraction particle size measurement device (for example, Microtrac MT 3000) to be irradiated with ultrasonic waves of about 28 kHz to an output of 60 W. Thereafter, the average particle diameter ($D_{50}$) which corresponds to 50% of volume accumulation in the measurement device may be calculated.

Method for Preparing Positive Electrode Active Material Precursor

The present inventors have discovered that when preparing a positive electrode active material precursor using a single reactor, by adjusting a pH during a reaction and a reaction solution during a reaction, it is possible not only to uniformly mix positive electrode active material particles in a bimodal form having different average particle diameters ($D_{50}$) and different average composition, but also to improve the productivity and packing density per unit volume of the positive electrode active material precursor, and have completed the present invention.

Specifically, in order to prepare a bimodal-type positive electrode active material precursor for a lithium secondary battery of the present invention, there are included step 1 of preparing a first transition metal aqueous solution and a second transition metal aqueous solution, step 2 of adding a first reaction raw material including the first transition metal aqueous solution, an ammonium cation complex forming agent, and a basic aqueous solution to a reactor, and then subjecting the mixture to a co-precipitation reaction under a primary pH condition to form nuclei of first positive electrode active material precursor particles, step 3 of adjusting the input amount of the first reaction raw material in order to adjust the pH in the reactor to be a secondary pH condition which is in a lower range than the primary pH condition, and growing the first positive electrode active material precursor particles, step 4 of adding a second reaction raw material including the second transition metal aqueous solution, an ammonium cation complex forming agent, and a basic aqueous solution to the reactor containing the first positive electrode active material precursor particles to allow the pH in the reactor to meet the primary pH condition, and then subjecting the mixture to a co-precipitation reaction to form nuclei of second positive electrode active material precursor particles, and step 5 of adjusting the input amount of the second reaction raw material in order to adjust the pH in the reactor to meet the secondary pH condition, and then simultaneously growing the first positive electrode active material precursor particles and the second positive electrode active material precursor particles to prepare a bimodal-type positive electrode active material precursor including the first positive electrode active material precursor particles and the second positive electrode active material precursor particles having different average particle diameters ($D_{50}$).

Hereinafter, a method for preparing a positive electrode active material precursor, the method according to the present invention will be described in detail.

First, step 1 for preparing the positive electrode active material precursor according to the present invention is a step of preparing a first transition metal aqueous solution and a second transition metal aqueous solution.

The first transition metal aqueous solution and the second transition metal aqueous solution independently include a cation of at least one transition metal selected from the group consisting of nickel, manganese, and cobalt, wherein the concentration of the cation of a transition metal included in the first transition metal aqueous solution and the second transition metal aqueous solution may be different.

For example, the first transition metal aqueous solution may include 60-98 mol % of nickel, 1-40 mol % of manganese, and 1-40 mol % of cobalt, and the second transition metal aqueous solution may include 20-60 mol % of nickel, 20-60 mol % of manganese, and 20-60 mol % of cobalt. Specifically, the first transition metal aqueous solution may be a solution having a higher concentration of cations of nickel than the second transition metal aqueous solution. For example, the first transition metal aqueous solution may include a nickel salt in 60 mol % to 98 mol %, preferably 60 mol % to 80 mol %, more preferably 60 mol % to 70 mol % based on the total transition metal salts, and the second transition metal aqueous solution may include a nickel salt in 20 mol % to 60 mol %, preferably 40 mol % to 60 mol % based on the total transition metal salts.

In addition, the first transition metal aqueous solution may be a solution having a lower concentration of cations of at least one transition metal of manganese and cobalt than the second transition metal aqueous solution. For example, the first transition metal aqueous solution may include a manganese salt and/or a cobalt salt in 1 mol % to 40 mol %, preferably 1 mol % to 20 mol % based on the total transition metal salts, and the second transition metal aqueous solution may include a manganese salt and/or a cobalt salt in 20 mol % to 60 mol %, preferably 20 mol % to 50 mol % based on the total transition metal salts.

The first transition metal aqueous solution and the second transition metal aqueous solution may independently include an acetate, a nitrate, a sulfate, a halide, a sulfide, a hydroxide, an oxide, or an oxyhydroxide, and the like of the transition metals, and are not particularly limited as long as they may be dissolved in water.

For example, the nickel raw material may be an acetate, a nitrate, a sulfate, a halide, a sulfide, a hydroxide, an oxide, or an oxyhydroxide, and the like, all containing nickel, specifically $Ni(OH)_2$, $NiO$, $NiOOH$, $NiCO_3 \cdot 2Ni$ $(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but is not limited thereto.

The cobalt raw material may be an acetate, a nitrate, a sulfate, a halide, a sulfide, a hydroxide, an oxide, or an oxyhydroxide, and the like, all containing cobalt, specifically $Co(OH)_2$, $CoOOOH$, $Co(OCOCH_3)_2 \cdot 4H_2O$, $CO$ $(NO_3)_2 \cdot 6H_2O$, $CoSO_4$, $Co(SO_4)_2 \cdot 7H_2O$, or a combination thereof, but is not limited thereto.

The manganese-containing raw material may be an acetate, a nitrate, a sulfate, a halide, a sulfide, a hydroxide, an oxide, or an oxyhydroxide, and the like, all containing manganese, specifically a manganese oxide such as $Mn_2O_3$, $MnO_2$, $Mn_3O_4$, and the like, a manganese salt such as $MnCO_3$, $Mn(NO_3)_2$, $MnSO_4$, manganese acetate, dicarboxylic acid manganese, citric acid manganese, and fatty acid manganese salt, oxyhydroxide, manganese chloride, or a combination thereof, but is not limited thereto.

The first transition metal aqueous solution and/or the second transition metal aqueous solution may be prepared by adding a nickel-containing raw material, a cobalt-containing raw material, and a manganese-containing raw material to a solvent, specifically water, or a mixed solvent of water and an organic solvent (for example, alcohol, etc.) which may be uniformly mixed with water. Alternatively, the transition metal solution may be prepared by mixing an aqueous solution of a nickel-containing raw material, an aqueous solution of a cobalt-containing raw material, and an aqueous solution of a manganese-containing raw material.

In addition, the first transition metal aqueous solution and/or the second transition metal aqueous solution may further include another metal element (M) if necessary, in addition to nickel, manganese, and cobalt. At this time, M may include at least one selected from the group consisting of W, Mo, Cr, Al, Zr, Ti, Mg, Ta, and Nb.

When the first transition metal aqueous solution and/or the second transition metal aqueous solution further include the metal element (M), a raw material containing the metal element (M) may be selectively further included when preparing the first transition metal aqueous solution and/or the second transition metal aqueous solution.

As the raw material containing the metal element (M), at least one selected from the group consisting of an acetate, a nitrate, a sulfate, a halide, a sulfide, a hydroxide, an oxide, or an oxyhydroxide, all containing the metal element (M), may be used. For example, when the metal element (M) is W, a tungsten oxide or the like may be used.

By controlling the concentration of each of the nickel raw material, the cobalt raw material, and the manganese raw material included in the first transition metal aqueous solution and/or the second transition metal aqueous solution, it is possible to control the composition of a positive electrode active material precursor to be finally prepared. For example, by controlling the concentration of each of the raw materials, it is possible to prepare a positive electrode active material precursor having the content of nickel of 60 mol % of the total metal content, in which case, it is possible to implement high-capacity properties due to the inclusion of high nickel (high-Ni).

Next, step 2 for preparing the positive electrode active material precursor according to the present invention is a step of adding a first reaction raw material including the first transition metal aqueous solution prepared in step 1, an ammonium cation complex forming agent, and a basic aqueous solution to a reactor, and then subjecting the mixture to a co-precipitation reaction under a primary pH condition to form nuclei of first positive electrode active material precursor particles.

Specifically, the ammonium cation complex forming agent and the basic aqueous solution may be first introduced to a predetermined volume of the reactor to control the pH inside the reactor, and then the first transition metal aqueous solution may be added thereto to form the nuclei of first positive electrode active material precursor particles. At this time, since a pH value changes according to the generation of the nuclei of the first positive electrode active material precursor particles due to the input of the first transition metal aqueous solution, the basic aqueous solution and the ammonium cation complex forming agent may be continuously input together with the input of the first transition metal aqueous solution to control such that the primary pH condition is maintained. At this time, the primary pH condition may be controlled to maintain a pH of 12 or higher, preferably pH 12 to pH 13. When the above range of a pH value is satisfied, the nuclei of the particles are preferentially generated and the growth of the particles may hardly occur.

The basic aqueous solution may include at least one selected from the group consisting of NaOH, KOH, and $Ca(OH)_2$, and as a solvent, water, or a mixture of an organic solvent which may be uniformly mixed with water and water may be used. At this time, the concentration of the basic aqueous solution may be 2 M to 10 M, preferably 2.5 M to 3.5 M. When the concentration of the basic aqueous solution is 2 M to 10 M, it is possible to form precursor particles having a uniform size, and it takes a short time to form the precursor particles and the yield thereof may also be excellent.

The ammonium cation complex forming agent may include at least one selected from the group consisting of $NH_4OH$, $(NH_4)_2SO_4$, $NH_4NO_3$, $NH_4Cl$, $CH_3COONH_4$, and $NH_4CO_3$. At this time, as a solvent, water, or a mixture of an organic solvent (for example, alcohol, etc.) which may be uniformly mixed with water and water may be used.

Next, step 3 for preparing the positive electrode active material precursor according to the present invention is a step of adjusting the input amount of the first reaction raw material in order to adjust the pH in the reactor to be a secondary pH condition which is in a lower range than the primary pH condition, and growing the first positive electrode active material precursor particles.

Specifically, when the generation of the nuclei of the particles is terminated in step 2, the input amount of the ammonium cation complex forming agent and the basic aqueous solution may be adjusted to adjust the pH in the reactor to be a secondary pH condition which is in a lower range than the primary pH condition. For example, the secondary pH condition may be a range of less than pH 12, preferably pH 10 to less than pH 12, more preferably pH 10 to pH 11.9. The pH in the reactor may be adjusted to satisfy the secondary pH condition, and then the first transition metal aqueous solution may be added thereto to grow the nuclei of the first positive electrode active material precursor particles generated in step 2. At this time, since a pH value in the reactor changes according to the growth of the particles due to the input of the first transition metal aqueous solution, the basic aqueous solution and the ammonium cation complex forming agent may be continuously input together with the input of the first transition metal aqueous solution to control such that the secondary pH condition, preferably less than pH 12, is maintained. When the above range of a pH value is satisfied, new nuclei of the particles are hardly generated, and the growth of the nuclei of the particles which have been already generated occurs preferentially.

Meanwhile, the reactor according to the present invention may further include a filtration apparatus. Specifically, when the reactor is full of liquid, only a reaction mother liquid subjected to a reaction may be effectively discharged to the outside of the reactor without stopping the input of reaction raw materials. For example, the filtration apparatus may be used without particular limitation as long as it may easily filter the mother liquid. For example, one or a plurality of two or more of the filtration apparatuses may be installed inside the reactor and/or the outside the reactor to discharge only the reaction mother liquid subjected to the reaction inside the reactor, but the present invention is not limited thereto. At this time, when the reactor is full of liquid, the discharge flow rate of the reaction mother liquid discharged to the outside may be the same as the input flow rate of the reaction raw materials, but the present invention is not limited thereto.

Next, step 4 for preparing the positive electrode active material precursor according to the present invention is a step of adding a second reaction raw material including the second transition metal aqueous solution, an ammonium cation complex forming agent, and a basic aqueous solution to the reactor containing the first positive electrode active material precursor particles to allow the pH in the reactor to meet the primary pH condition, and then subjecting the mixture to a co-precipitation reaction to form nuclei of second positive electrode active material precursor particles.

Specifically, step 4 is a step for forming the nuclei of the second positive electrode active material precursor particles in the reactor including the first positive electrode active material precursor particles.

For example, when step 4 is performed without changing the first transition metal aqueous solution to the second transition metal aqueous solution as in the present invention, the nuclei the first positive electrode active material precursor particles are additionally generated in the reactor as the pH is changed to the primary pH condition.

That is, positive electrode active material precursors having different average particle diameters ($D_{50}$) may be prepared in the same reactor, but the positive electrode active material precursors prepared at this time may be formed to have the same composition. In this case, when positive electrode active material precursor particles are mixed with a lithium raw material and then fired to prepare a positive electrode active material, positive electrode active material precursor particles having a large average particle diameter ($D_{50}$) are partially fired, and positive electrode active material precursor particles having a small average particle diameter ($D_{50}$) are over-fired, so that there is a problem in that firing uniformity is inferior.

However, as in the present invention, when the concentration of a transition metal aqueous solution is changed when preparing a positive electrode active material precursor, the average composition of the first positive electrode active material precursor particles and the average composition of the second positive electrode active material precursor particles are controlled to be different to compensate for the problem of firing uniformity according to the difference in average particle diameter ($D_{50}$), firing uniformity may be improved.

Specifically, the ammonium cation complex forming agent and the basic aqueous solution are introduced into the reactor in which the first positive electrode active material precursor particles are generated to adjust the pH inside the reactor to meet the primary pH condition, for example, pH 12 or higher, and then the second transition metal aqueous solution may be added thereto to form the nuclei of second positive electrode active material precursor particles. At this time, since a pH value changes according to the generation of the nuclei of the second positive electrode active material precursor particles due to the input of the second transition metal aqueous solution, the basic aqueous solution and the ammonium cation complex forming agent may be continuously input together with the input of the second transition metal aqueous solution to control such that pH 12 or higher, preferably pH 12 to pH 13 is maintained. When the above range of a pH value is satisfied, the nuclei of the particles are preferentially generated and the growth of the particles may hardly occur, and in the reactor, the nuclei of the first positive electrode active material precursor particles and the nuclei of the second positive electrode active material precursor particles are present.

Next, step 5 for preparing the positive electrode active material precursor according to the present invention is a step of adjusting the input amount of the second reaction raw material in order to adjust the pH in the reactor to meet the secondary pH condition, for example, less than pH 12, and then simultaneously growing the first positive electrode active material precursor particles and the second positive electrode active material precursor particles to prepare a bimodal-type positive electrode active material precursor including the first positive electrode active material precursor particles and the second positive electrode active material precursor particles having different average particle diameters ($D_{50}$).

Specifically, when the generation of the nuclei of the second positive electrode active material precursor particles is terminated in step 4, the input amount of the ammonium cation complex forming agent and the basic aqueous solution may be adjusted to adjust the pH in the reactor to be in a range of less than pH 12, preferably pH 10 to less than pH 12, more preferably pH 10 to pH 11.9, and then the second transition metal aqueous solution is introduced. As in step 3 described above, when the above range of a pH value is satisfied, new nuclei of the particles are hardly generated, and the growth of the nuclei of the particles which have been already generated occurs preferentially. Therefore, not only the nuclei of the second positive electrode active material precursor particles but the nuclei of the first positive electrode active material precursor particles may grow.

That is, the first positive electrode active material precursor particles may have a core-shell structure including a core portion containing nickel, cobalt, and manganese in the same molar ratio as the first transition metal aqueous solution by step 2 and step 3 described above and a shell portion formed on the surface of the core portion and containing nickel, cobalt and manganese in the same molar ratio as the second transition metal aqueous solution by step 5.

At this time, the volume occupied by the core portion and the shell portion of the total first positive electrode active material precursor particles may be controlled by the reaction time of step 3 and step 5. For example, the first positive electrode active material precursor particles may be a region corresponding to a volume of 65-85 vol %, preferably 75-85 vol % of the total volume of particles from the center of the particles. As described above, when the core portion is formed in the above volume range of the total volume of the first positive electrode active material particles, nickel is included in a high content, so that high capacity properties may be further improved.

Meanwhile, it is preferable that the first positive electrode active material precursor particles and the second positive electrode active material precursor particles are formed at a weight ratio of 9:1 to 6:4, preferably 8:2 to 7:3 in terms of improving packing density per unit volume, and by adjusting the reaction time in step 2 and the reaction time in step 4, the ratio of the first positive electrode active material precursor particles and the second positive electrode active material precursor particles may be adjusted. For example, when the ratio of the second positive electrode active material precursor particles is lower than the above range, the change in the composition of the first positive electrode active material precursor particles is insignificant, and the average particle diameter is reduced due to the lack of time during which a second positive electrode active material precursor may grow, so that there is a limitation in improving firing non-uniformity. On the other hand, when the ratio of the second positive electrode active material precursor particles is higher than the above range, the effect of improving the packing density due to a bimodal-type particle size distribution may be insignificant.

In addition, by adjusting the reaction time of step 3 and the reaction time of step 5, it is possible to adjust the average particle diameter ($D_{50}$) of first positive electrode active material precursor particles and second positive electrode active material precursor particles.

For example, the average particle diameter ($D_{50}$) of the first positive electrode active material precursor particles may be 8 μm to 15 μm, preferably 10 μm to 13 μm. When the average particle diameter ($D_{50}$) of the first positive electrode active material precursor particles satisfies the above range, the tap density of the first positive electrode active material precursor may increase.

For example, the average particle diameter ($D_{50}$) of the second positive electrode active material precursor particles may be 1 μm to 8 μm, preferably 2 μm to 6 μm, more preferably 3 μm to 5 μm. When the average particle diameter ($D_{50}$) of the second positive electrode active material precursor particles satisfies the above range, the tap density may be further improved when mixing with the first positive electrode active material precursor having the above average particle diameter.

Since the bimodal-type precursor according to the present invention includes the first positive electrode active material precursor particles and the second positive electrode active material precursor particles each having an average particle diameter ($D_{50}$ of the above ranges, the second positive electrode active material precursor having a relatively smaller average particle diameter ($D_{50}$ is positioned in an empty space of the first positive electrode active material precursor particles, so that the packing density per unit volume may be further increased.

Next, a process of separating, washing and drying the obtained bimodal-type precursor may be further performed.

The washing step may be performed by, for example, introducing a lithium transition metal oxide into pure water, and then stirring the same. At this time, the temperature for the rinsing with water may be 20° C. or less, preferably 10° C. to 20° C., and the duration for the rinsing with water may be 10 minutes to 1 hour.

The drying is to dry the washing solution, and any method may be used without particular limitation as long as it is a method capable of drying the solution without causing a chemical change in the obtained positive electrode active material precursor particles. For example, the drying may be performed by a spray drying method, a drying method using a rotary evaporator, a vacuum drying method, or a natural drying method.

Positive Electrode Active Material Precursor

In addition, the present invention provides a bimodal-type positive electrode active material precursor prepared by the method described above and first positive electrode active material precursor particles having an average particle diameter ($D_{50}$) of 8 μm to 15 μm and having a core-shell structure and second positive electrode active material precursor particles having an average particle diameter ($D_{50}$) of 1 μm to less than 8 μm, wherein the first positive electrode active material precursor particles have a core-shell structure including a core portion having a nickel content of 60 mol % or greater based on the total number of moles of transition metals and a shell portion formed on the surface of the core portion and having a different average composition from the core portion. Since the bimodal-type positive electrode active material precursor is prepared by the above-described preparation method, productivity over the same amount of time may be significantly improved.

Since the bimodal-type positive electrode active material precursor according to the present invention is prepared in a single reactor, compared to a typical case in which a small-diameter precursor and a large-diameter precursor are respectively prepared in different reactors, separated, recovered, and then mixed to prepare a bimodal-type precursor, it is possible not only to improve productivity but also to reduce preparation costs and preparation time due to less separation device and space.

Also, the bimodal-type positive electrode active material precursor may have a tap density of 2.15 g/cc to 2.4 g/cc, preferably 2.25 g/cc to 2.4 g/cc.

Also, the pellet density measured after the bimodal-type positive electrode active material precursor according to the present invention was compressed to a rolling density of 1.5 kgf/cm² to 3.0 kgf/cm² to be prepared in the form of pellets may be 2.8 g/cc to 3.2 g/cc, preferably 2.85 g/cc to 3.2 g/cc.

Positive Electrode Active Material and Method for Preparing Positive Electrode Active Material In addition, according to the present invention, a positive electrode active material prepared by using a positive electrode active material precursor prepared by the above-described preparation method may be provided.

Specifically, the positive electrode active material may be prepared by mixing a bimodal-type positive electrode active material precursor having first positive electrode active material precursor particles having an average particle diameter ($D_{50}$) of 8 μm to 15 μm and having a core-shell structure and second positive electrode active material precursor particles having an average particle diameter ($D_{50}$) of 1 μm to less than 8 μm with a lithium-containing raw material and then firing the mixture.

The lithium-containing raw material is not particularly limited as long as it is a compound containing a lithium source. However, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The bimodal-type positive electrode active material precursor and the lithium-containing raw material may be mixed such that the molar ratio of Me:Li is 1:0.9 to 1:1.8. If the lithium-containing raw material is mixed in a range less than the above range, the capacity of a positive electrode active material to be prepared may be deteriorated. If the lithium-containing raw material is mixed in a range greater than the above range, particles may be sintered in a firing process, so that it may be difficult to prepare a positive electrode active material, and the deterioration in capacity and the separation of positive electrode active material particles after firing may be occur.

Thereafter, the mixture in which the bimodal-type positive electrode active material precursor and the lithium-containing raw material are mixed is fired.

In the case of the positive electrode active material precursor according to the present invention, even though the average particle diameter ($D_{50}$) of the first positive electrode active material precursor particles and the average particle diameter ($D_{50}$) of the second positive electrode active material precursor particles are different, since the average composition of the first positive electrode active material precursor particles and the average composition of the second positive electrode active material precursor particles are formed to be different as described above, a firing non-uniformity problem in which a small-diameter positive electrode active material is over-fired and a large-diameter positive electrode active material is insufficiently fired, the problem which may occur when a small-diameter positive electrode active material precursor and a large-diameter positive electrode active material precursor are mixed and fired at the same temperature, may be solved by varying the composition of the small-diameter positive electrode active material precursor and the composition of the large-diameter positive electrode active material precursor to compensate an influence by temperature, so that a positive electrode active material having excellent firing uniformity may be prepared.

The firing may be performed at a temperature of 700° C. to 950° C. For example, when the firing temperature is less than 700° C., the raw material remains in particles due to an insufficient reaction, so that the high-temperature stability of a battery may be deteriorated, and volume density and crystallinity may be deteriorated, so that structural stability may be reduced. Meanwhile, when the firing temperature is greater than 950° C., particles may grow non-uniformly, and since the size of particles becomes great, the amount of particles which may be included per unit area is reduced, so that the volume capacity of the battery may be deteriorated. Meanwhile, when considering the particle size control, capacity, and stability of a positive electrode active material to be prepared and the reduction in lithium-containing by-products, the firing temperature may be more preferably 770° C. to 850° C.

The firing may be performed for 6 hours to 13 hours. When the firing time is less than 6 hours, the reaction time is too short to obtain a high-crystalline positive electrode active material. When greater than 13 hours, the size of particles may excessively increase and the productivity efficiency may be deteriorated.

Positive Electrode

In addition, the present invention provides a positive electrode for lithium secondary battery, the positive electrode including a positive electrode active material prepared by the method described above.

Specifically, the positive electrode for secondary battery includes a positive electrode current collector and a positive electrode active material layer formed on the positive electrode current collector, wherein the positive electrode active material layer provides the positive electrode for lithium secondary battery including the positive electrode active material according to the present invention.

At this time, the positive electrode active material is the same as that described above, and thus, a detailed description thereof will be omitted. Hereinafter, only the rest of the components will be described in detail.

The positive electrode current collector is not particularly limited as long as it has a conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3-500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, and a non-woven body.

The positive electrode active material layer may include a conductive material and, if necessary, selectively a binder, together with the positive electrode active material.

At this time, the positive electrode active material may be included in an amount of 80-99 wt %, more specifically 85-98.5 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 0.1-15 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 0.1-15 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which has been prepared by dissolving or dispersing the positive electrode active material described above and selectively, a binder and a conductive material in a solvent, on a positive electrode current collector, followed by drying and roll-pressing.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes.

The negative electrode active material may be included in an amount of 80 parts by weight to 99 parts by weight based on the total weight of a negative electrode active material layer.

The binder is a component for assisting in bonding between a conductive material, an active material, and a current collector, and is typically added in an amount of 0.1 parts by weight to 10 parts by weight based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, preferably 5 parts by weight or less based on the total weight of a negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying. Alternatively, the negative electrode active material layer may be prepared by casting the composition for forming a negative electrode active material on a separate support, and then laminating a film peeled off from the support on a negative electrode current collector.

The negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying, or may be prepared by casting the composition for forming a negative electrode active material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, $\gamma$-butyrolactone, and $\varepsilon$-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like may be used. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1-5 parts by weight based on the total weight of an electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in more detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

$NiSO_4$, $CoSO_4$, and $MnSO_4$ were mixed in water in an amount such that the molar ratio of nickel:cobalt manganese was 73:7:20 to prepare a first transition metal aqueous solution having a concentration of 2.4 M. In addition, $NiSO_4$, $CoSO_4$, and $MnSO_4$ were mixed in water in an amount such that the molar ratio of nickel:cobalt manganese was 68:12:20 to prepare a second transition metal aqueous solution having a concentration of 2.4 M.

A container containing the first transition metal aqueous solution, a container containing the second transition metal aqueous solution, a container containing a NaOH aqueous solution having a concentration of 25 wt %, and a container containing a $NH_4OH$ aqueous solution having a concentration of 9 wt % were all connected to a reactor (70 L).

Thereafter, 20 L of deionized water was added to the reactor, and then nitrogen gas was purged in the reactor at a rate of 10 L/min to remove dissolved oxygen in the water and create a non-oxidizing atmosphere inside the reactor.

Thereafter, 40 mL of an NaOH aqueous solution having a concentration of 25 wt % and 870 mL of an $NH_4OH$ aqueous solution having a concentration of 9 wt % were added thereto, and the mixture was stirred at a stirring rate of 550 rpm at 50° C. to maintain the pH in the reactor at pH 12.2.

Thereafter, the first transition metal aqueous solution, the NaOH aqueous solution, and the $NH_4OH$ aqueous solution were added to the reactor at a rate of 8 mol/hr, 16 mol/hr, and 2.4 mol/hr, respectively, to perform a reaction for 240 minutes to form nuclei of first positive electrode active material precursor particles.

Thereafter, the first transition metal aqueous solution, the NaOH aqueous solution, and the $NH_4OH$ aqueous solution were added to the reactor such that the pH in the reactor was to be pH 11.6, and by maintaining the reaction for three hours at pH 11.6, the first positive electrode active material precursor particles were grown and the reactor became full of liquid.

When the reactor became full with liquid, a solvent subjected to the reaction was discharged to the outside of the reactor through a filtration device located in the reactor, and at the same time, the first transition metal aqueous solution, the NaOH aqueous solution, and $NH_4OH$ aqueous solution were added to the reactor to maintain the reaction for 25 hours to grow the first positive electrode active material precursor particles.

Thereafter, the first transition metal aqueous solution was stopped from being supplied but the second transition metal aqueous solution was supplied, and the second transition metal aqueous solution, the NaOH aqueous solution and the $NH_4OH$ aqueous solution were added to the reactor such that the pH in the reactor was to be pH 12.6 and nuclei of the second positive electrode active material precursor particles were formed for 56 minutes.

Thereafter, the input amount of each of the second transition metal aqueous solution, the NaOH aqueous solution, and the $NH_4OH$ aqueous solution was changed such that the pH in the reactor was to be pH 11.6, and the first positive electrode active material precursor particles and the second positive electrode active material precursor particles were simultaneously grown until the total reaction time reached 80 hours to finally prepare a precursor having an average composition of $Ni_{0.6}Co_{0.2}Mn_{0.2}(OH)_2$ and having a bimodal form.

Comparative Example 1

A large-diameter positive electrode active material precursor and a small-diameter positive electrode active material precursor having a core-shell structure were separately prepared and then mixed together to prepare a bimodal precursor.

First, in order to prepare a large-diameter positive electrode active material precursor, a non-oxidizing atmosphere was created inside a reactor (70 L) in the same manner as in Example 1. Then, 40 mL of an NaOH aqueous solution having a concentration of 25 wt % and 870 mL of an $NH_4OH$ aqueous solution having a concentration of 9 wt % were added to the reactor, and the mixture was stirred at a stirring rate of 550 rpm at 50° C. to maintain the pH in the reactor at pH 12.2. Thereafter, the first transition metal aqueous solution, the NaOH aqueous solution, and the $NH_4OH$ aqueous solution were added to the reactor at a rate of 8 mol/hr, 16 mol/hr, and 2.4 mol/hr, respectively, to perform a reaction for 240 minutes to form nuclei of positive electrode active material precursor particles. Thereafter, the first transition metal aqueous solution, the NaOH aqueous solution, and the $NH_4OH$ aqueous solution were added to the reactor such that the pH in the reactor was to be pH 11.6, and by maintaining the reaction for three hours at pH 11.6, the first positive electrode active material precursor particles were grown and the reactor became full of liquid. When the reactor became full with liquid, a solvent subjected to the reaction was discharged to the outside of the reactor through a filtration device located in the reactor, and at the same time, the first transition metal aqueous solution, the NaOH aqueous solution, and $NH_4OH$ aqueous solution were added to the reactor to maintain the reaction for 25 hours to grow the first positive electrode active material precursor particles, and as a result, a core portion having an average composition of $Ni_{0.73}Co_{0.07}Mn_{0.2}(OH)_2$ was formed. Thereafter, the first transition metal aqueous solution was stopped from being supplied but the second transition metal aqueous solution was supplied, and the positive electrode active material precursor particles were grown until the total reaction time reached 80 hours to form a large-diameter precursor having a shell portion which has an average composition of $Ni_{0.68}Co_{0.12}Mn_{0.2}(OH)_2$ and having an average particle diameter ($D_{50}$) of 10.8 μm on the surface of the core portion.

Next, in order to prepare a small-diameter positive electrode active material precursor, a non-oxidizing atmosphere was created inside a reactor (70 L) in the same manner as in Example 1. Then, 40 mL of an NaOH aqueous solution having a concentration of 25 wt % and 870 mL of an $NH_4OH$ aqueous solution having a concentration of 9 wt % were added to the reactor, and the mixture was stirred at a stirring rate of 550 rpm at 50° C. to maintain the pH in the reactor at pH 12.2. Thereafter, the second transition metal aqueous solution, the NaOH aqueous solution, and the $NH_4OH$ aqueous solution were added to the reactor at a rate of 8 mol/hr, 16 mol/hr, and 2.4 mol/hr, respectively, to perform a reaction for 240 minutes to form nuclei of positive electrode active material precursor particles. Thereafter, the second transition metal aqueous solution, the NaOH aqueous solution, and the $NH_4OH$ aqueous solution were added to the reactor such that the pH in the reactor was to be pH 11.6, and by maintaining the reaction for 44 hours at pH 11.6, second positive electrode active material precursor particles were grown to form a small-diameter precursor having an average composition of $Ni_{0.68}Co_{0.12}Mn_{0.2}(OH)_2$ and an average particle diameter ($D_{50}$) of 3.8 μm.

The large-diameter positive electrode active material precursor and the small-diameter positive electrode active material precursor prepared above were mixed at a ratio of 70:30 (wt %) to prepare a bimodal-type precursor.

Comparative Example 2

A large-diameter positive electrode active material precursor and a small-diameter positive electrode active material precursor were separately prepared and then mixed together to prepare a bimodal precursor.

At this time, a bimodal-type precursor was prepares in the same manner as in Comparative Example 1 except that $NiSO_4$, $CoSO_4$, and $MnSO_4$ were mixed in water in an amount such that the molar ratio of nickel:cobalt manganese was to be 70:10:20 to prepare a transition metal aqueous solution having a concentration of 2.4 M, and by using the transition metal aqueous solution, a large-diameter having a single composition, an average composition of $Ni_{0.7}Co_{0.1}Mn_{0.2}(OH)_2$, and an average particle diameter ($D_{50}$) of 10.8 μm and a small-diameter having an average composition of $Ni_{0.7}Co_{0.1}Mn_{0.2}(OH)_2$ and an average particle diameter ($D_{50}$) of 3.8 μm were prepared and used.

Experimental Example 1: Evaluation of Properties of Positive Electrode Active Material Precursor The positive electrode active material precursor prepared in each of Example 1 and Comparative Examples 1 and 2 was evaluated for particle properties.
1) Evaluation of Tap Density
50 g of the positive electrode active material precursor obtained in each of Example 1 and Comparative Examples 1 was filled in a 100 mL container, and then the apparent density of particles obtained by vibrating under predetermined conditions was measured. Specifically, the tap density of a positive electrode material was measured using a tap density tester (KYT-4000, Seishin Co., Ltd). The measurement results are shown in Table 1 below.
2) Evaluation of Pellet Density
The positive electrode active material precursor particles prepared in each of Examples 1 and Comparative Example 1 were compressed to a roll-pressing density of 2.5 kgf/cm² to be prepared in the form of pellets, and then the density of the positive electrode active material precursor was measured using a density measuring device (4350L, Carver Co., Ltd.). The measurement results are shown in Table 1 below.

TABLE 1

|  | Tap density (g/cc) | Pellet density (g/cc) |
|---|---|---|
| Example 1 | 2.30 | 2.88 |
| Comparative Example 1 | 2.19 | 2.83 |
| Comparative Example 2 | 2.17 | 2.81 |

Figure 2:
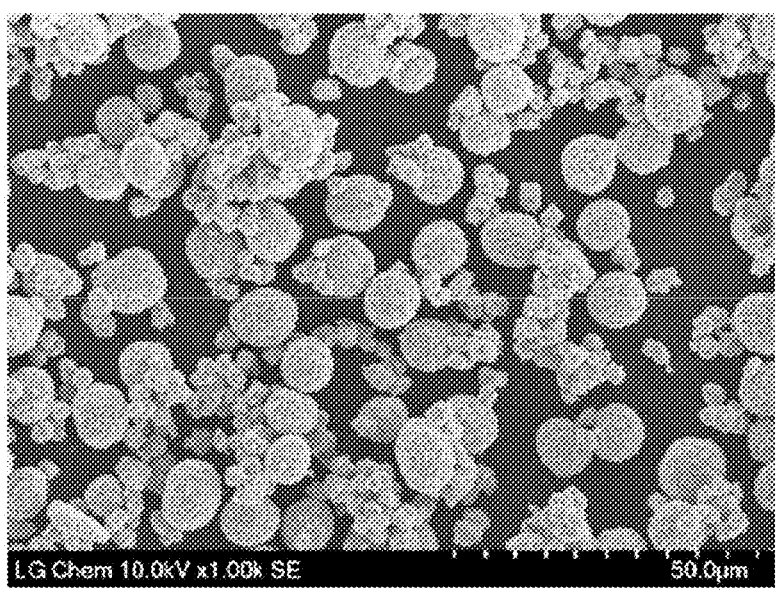
FIG. 2 is an SEM image of a positive electrode active material precursor prepared in Comparative Example 1.
Figure 3:
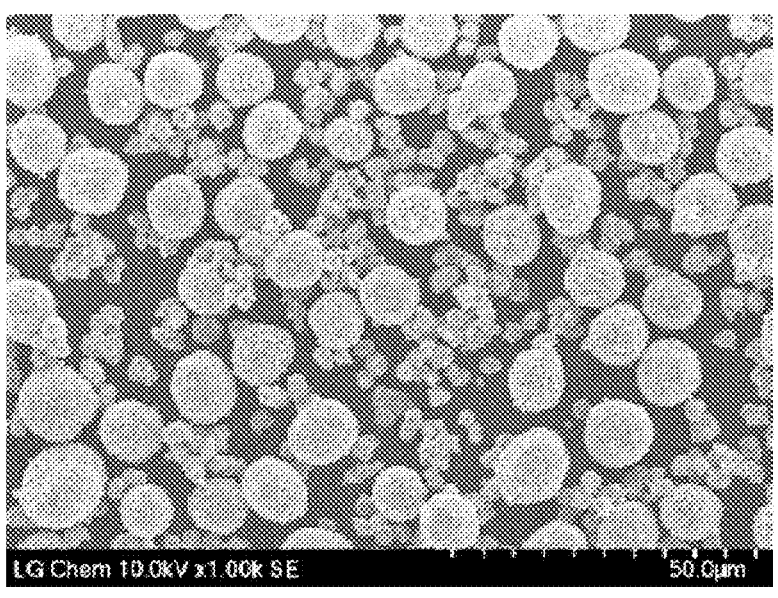
FIG. 3 is an SEM image of a positive electrode active material precursor prepared in Comparative Example 2.

As shown in Table 1, it was confirmed that the positive electrode active material precursor prepared in Example 1 of the present invention had improved tap density and pellet density compared to the positive electrode active material precursor prepared in each of Comparative Examples 1 and 2.
3) Identification of Surface Properties of Positive Electrode Active Material Precursor
The positive electrode active material precursor prepared in each of Example 1 and Comparative Examples 1 and was evaluated for surface properties using a scanning electron microscope.
FIG. 1 to FIG. 3 are SEM images respectively showing the surface properties of the positive electrode active material precursor prepared in each of Example 1 and Comparative Examples 1 and 2 of the present invention.

As shown in FIG. 1 to FIG. 3, it was confirmed that even though the large-diameter positive electrode active material precursor and the small-diameter positive electrode active material precursor were prepared in a single reactor as in the present invention, the surface properties were similar to the surface properties of FIG. 2 and FIG. 3 in which the large-particle positive electrode active material precursor and the small-particle positive electrode active material precursor were separately prepared and then mixed together.

Experimental Example 2: Identification of Particle Size Distribution

In order to identify the particle size distribution of the positive electrode active material precursor particles prepared in each of Example 1 and Comparative Examples 1 and 2, the particle size of the positive electrode active material precursor prepared in each of Example 1 and Comparative Examples 1 and 2 was measured using a particle size distribution measuring device (S-3500, Microtrac Co., Ltd.), and the results are shown in Table 2 and FIG. 4 below.

TABLE 2

| | $D_{10}$ ($\mu$m) | $D_{50}$ ($\mu$m) | $D_{90}$ ($\mu$m) | ($D_{90} - D_{10}$)/$D_{50}$ |
|---|---|---|---|---|
| Example 1 | 3.31 | 10.13 | 14.90 | 1.14 |
| Comparative Example 1 | 6.66 | 10.10 | 13.84 | 0.71 |
| Comparative Example 2 | 3.03 | 9.36 | 13.52 | 1.12 |

Figure 4:
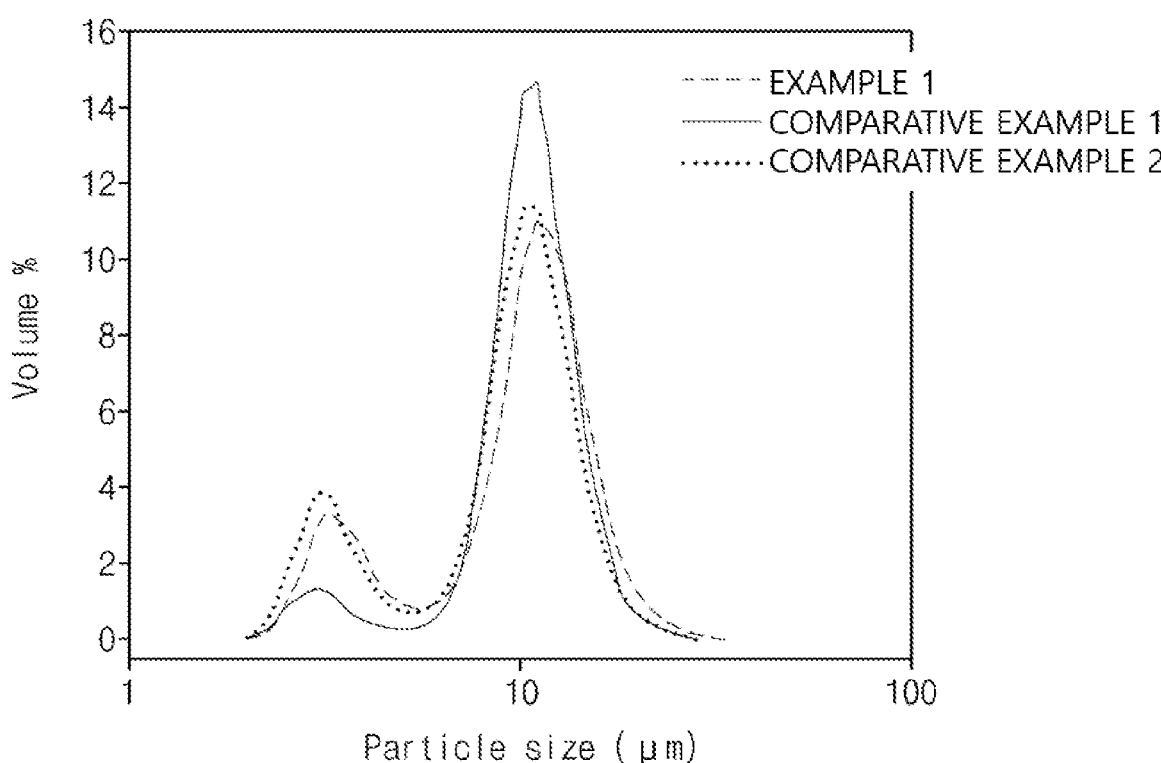
FIG. 4 is a graph showing the particle size distribution of a positive electrode active material precursor prepared in each of Example 1 and Comparative Examples 1 and 2.

As shown in Table 2 and FIG. 4, it was confirmed that even though the large-diameter positive electrode active material precursor and the small-diameter positive electrode active material precursor were prepared in a single reactor as in Example 1, the particle size distribution behavior thereof was similar to that of each of Comparative Examples 1 and 2 in which the large-particle positive electrode active material precursor and the small-particle positive electrode active material precursor were separately prepared and then mixed together.

Meanwhile, reviewing the particle size distribution results of FIG. 4, it was confirmed that even though the large-diameter positive electrode active material precursor and the small-diameter positive electrode active material precursor were prepared in a single reactor as in Example 1, two peaks appeared as in Comparative Examples 1 and 2. The first peak was viewed as the average particle diameter ($D_{50}$) of small particles, the second peak was viewed as the average particle diameter ($D_{50}$) of large particles, and the average particle diameter ($D_{50}$) at which each peak appeared is shown in Table 3 below.

TABLE 3

| | Small particle average $D_{50}$ ($\mu$m) | Large particle average $D_{50}$ ($\mu$m) |
|---|---|---|
| Example 1 | 3.27 | 11.00 |
| Comparative Example 1 | 2.99 | 11.00 |
| Comparative Example 2 | 2.99 | 10.09 |

Experimental Example 3: Identification of Yield of Positive Electrode Active Material Precursor In order to compare the productivity of the positive electrode active material precursor prepared in each of Example 1 and Comparative Examples 1 and 2, the content of the precursor prepared by the method of each of Example 1 and Comparative Examples 1 and 2 was measured using 10 reactors, and the results are shown in Table 4 below.

TABLE 4

| | Content of generated precursor (kg) |
|---|---|
| Example 1 | 100 |
| Comparative Example 1 | 90 |
| Comparative Example 2 | 90 |

As shown in Table 4, it was confirmed that the production amount of the positive electrode active material precursor prepared in Example 1 was greater than the production amount of the positive electrode active material precursor prepared in each of Comparative Examples 1 and 2 over the same period of time.

Experimental Example 4: Identification of Firing Uniformity of Positive Electrode Active Material In order to identify the plasticity uniformity of the positive electrode active material prepared using the positive electrode active material precursors prepared in Example 1 and Comparative Examples 1 to 2, the positive electrode active material precursor prepared in each of Example 1 and Comparative Examples 1 and 2 were mixed with LiOH at a ratio of 1:1.03 (wt %), and the mixture was fired at 830° C. for 10 hours to prepare a bimodal-type positive electrode active material. Using the positive electrode active material prepared above, a secondary battery was manufactured, and the initial capacity, resistance and lifespan properties of the secondary battery were identified.

At this time, the secondary battery was manufactured using the same method as follows, except that the positive electrode active material prepared in each of Example 1 and Comparative Examples 1 and 2 was used. Specifically, the positive electrode active material prepared in each of Example 1 and Comparative Examples 1 and 2, a carbon black conductive material (super-p), and a KF1100 binder (Kurea Co., Ltd.) were mixed at a weight ratio of 92.5:3.5: 4.0, and the mixture was mixed in a N-methylpyrrolidone (NMP) solvent to prepare a composition for forming a positive electrode. The composition for forming a positive electrode was applied on an Al current collector having a thickness of 20 $\mu$m, dried, and then roll-pressed to manufacture a positive electrode. The positive electrode manufactured above and a Li metal, which is used as a negative electrode, were stacked together with a single-layered separator having a thickness of 20 $\mu$m to manufacture a coin-type battery in a typical manner. The coin-type battery was then put into a battery case and injected with an electrolyte prepared by dissolving 1 M of $LiPF_6$ in a mixed solvent in which ethylene carbonate:ethyl methyl carbonate:diethyl carbonate are at a volume ratio of 3:4:3 to manufacture a lithium secondary battery according to each of Example 1 and Comparative Examples 1 and 2.

The lifespan properties of the lithium secondary batteries of Example 1 and Comparative Examples 1 and 2 prepared as described above were measured.

Specifically, each of the lithium secondary batteries prepared in Example 1 and Comparative Examples 1 and 2 was charged to 4.3 V with 0.2 C in a CC-CV mode at 25° C. (end current: 1/20 C), and then discharged to 3.0 V with a 0.2 C constant current to measure an initial charge capacity and an initial discharge capacity. Thereafter, charging was performed with a 0.5 C constant current to 4.3 V with a 1/20 C cut off, and then discharging was performed with a 1.0 C constant current until 3.0 V was reached. The charge/discharge behavior was set as one cycle, and the cycle was repeated 50 times. Thereafter, the lifespan properties of the lithium secondary batteries according to Example 1 and Comparative Examples 1 and 2 were measured, and the measurement results are shown in Table 5 below.

TABLE 5

|  | Initial discharge capacity (mAh/g) | Capacity retention rate at $50^{th}$ cycle (%) |
|---|---|---|
| Example 1 | 193.8 | 97.3 |
| Comparative Example 1 | 193.5 | 97.7 |
| Comparative Example 2 | 192.0 | 96.8 |

As shown in Table 5, it was confirmed that the initial discharge capacity of the secondary battery manufactured by using the positive electrode active material precursor of Example 1 was almost equal to that of Comparative Example 1 in which a large-diameter precursor and a small-diameter precursor which have the same compositions as in Example 1 were respectively synthesized in different reactors and then mixed together. On the other hand, in the case of Comparative Example 2 in which a large-diameter precursor and a small-diameter precursor were synthesized and fired in different reactors but the large-diameter precursor and the small-diameter precursor had the same compositions, it was confirmed that the capacity properties thereof were inferior to those of Example 1 due to the deterioration in firing uniformity.

Experimental Example 5: Identification of Resistance Properties of Lithium Secondary Battery The resistance properties of the lithium secondary batteries of Example 1 and Comparative Examples 1 and 2 prepared in Experimental Example 4 were respectively identified. Specifically, the lithium secondary battery of each of Example 1 and Comparative Examples 1 and 2 was charged with a constant current of 0.5 C at 25° C. and then discharged with a constant current of 1.0 C until 3.0 V was reached to measure a voltage drop, and a voltage value at the time of 60 seconds was divided by a current value to measure the resistance at 25° C., which is shown in Table 6 below.

TABLE 6

|  | Initial resistance (Ω) | Resistance at $50^{th}$ cycle (Ω) |
|---|---|---|
| Example 1 | 21.4 | 33.5 |
| Comparative Example 1 | 20.8 | 33.2 |
| Comparative Example 2 | 23.0 | 37.3 |

As shown in Table 6, the initial resistance of the secondary battery manufactured by using the positive electrode active material precursor of Example 1 was higher than that of Comparative Example 1 in which a large-diameter precursor and a small-diameter precursor which have the same compositions as in Example 1 were respectively synthesized in different reactors and then mixed together. However, as the cycle progressed, the deviation from Comparative Example 1 was reduced, so that it was confirmed that the initial resistance of Example 1 was almost equal to that of Comparative Example 1. Meanwhile, in the case of Comparative Example 2 in which a large-diameter precursor and a small-diameter precursor were synthesized and fired in different reactors but the large-diameter precursor and the small-diameter precursor had the same compositions, it was confirmed that the resistance properties thereof were inferior to those of Example 1 due to the deterioration in firing uniformity.

The invention claimed is:

1. A method for preparing a bimodal-type positive electrode active material precursor, comprising:

step 1 of preparing a first transition metal aqueous solution and a second transition metal aqueous solution;

step 2 of adding a first reaction raw material including the first transition metal aqueous solution, an ammonium cation complex forming agent, and a basic aqueous solution to a reactor, and performing a first co-precipitation reaction in the reactor under a primary pH condition to form nuclei of first positive electrode active material precursor particles;

step 3 of adjusting an input amount of the first reaction raw material to adjust a pH in the reactor to a secondary pH condition which is in a lower range than the primary pH condition, and growing the first positive electrode active material precursor particles;

step 4 of adding a second reaction raw material including the second transition metal aqueous solution, an ammonium cation complex forming agent, and a basic aqueous solution to the reactor containing the first positive electrode active material precursor particles to adjust the pH in the reactor to meet the primary pH condition, and performing a second co-precipitation reaction in the reactor to form nuclei of second positive electrode active material precursor particles; and step 5 of adjusting an input amount of the second reaction raw material to adjust the pH in the reactor to the secondary pH condition, and simultaneously growing the first positive electrode active material precursor particles and the second positive electrode active material precursor particles to prepare a bimodal-type positive electrode active material precursor including the first positive electrode active material precursor particles and the second positive electrode active material precursor particles having different average particle diameters ($D_{50}$), wherein the first transition metal aqueous solution comprises a first nickel raw material, a first cobalt raw material, and a first manganese raw material, and the second transition metal aqueous solution comprises a second nickel raw material, a second cobalt raw material, and a second manganese raw material, and the first nickel raw material has a higher concentration than the second nickel raw material, wherein the primary pH condition under which the nuclei of the first positive electrode active material precursor particles and the nuclei of the second positive electrode active material precursor particles form is set at pH 12 to pH 13, wherein the secondary pH condition under which the first positive electrode active material precursor particles and the second positive electrode active material precursor particles grow is set at pH 10 to pH 12, wherein a reaction time of the step 3 and a reaction time of the step 5 are adjusted to adjust the average particle diameters ($D_{50}$) of the first positive electrode active material precursor particles and the second positive electrode active material precursor particles, wherein the first positive electrode active material precursor particles have an average particle diameter ($D_{50}$) of 8 µm to 15 µm, and wherein the second positive electrode active material precursor particles have an average particle diameter ($D_{50}$) of 1 µm to less than 8 µm.

2. The method of claim 1, wherein the reactor further comprises a filtration apparatus, and when the reactor is full of liquid, a reaction raw material is introduced while discharging a reaction mother liquid, which has been subjected to a reaction, through the filtration apparatus to outside of the reactor.

3. The method of claim 1, wherein the first positive electrode active material precursor particles have a core-shell structure including a core portion containing a transition metal in an equal molar ratio as the first transition metal aqueous solution; and a shell portion formed on a surface of the core portion and containing a transition metal in an equal molar ratio as the second transition metal aqueous solution.

4. The method of claim 1, wherein the primary pH condition is pH 12 or higher.

5. The method of claim 1, wherein a reaction time of the step 2 and a reaction time of the step 4 are adjusted such that the first positive electrode active material precursor particles and the second positive electrode active material precursor particles are formed at a weight ratio of 9:1 to 6:4.

* * * * *